US012429187B1

(12) United States Patent
Jin

(10) Patent No.: US 12,429,187 B1
(45) Date of Patent: Sep. 30, 2025

(54) OPTICAL MODULE AND VEHICLE HAVING THE SAME

(71) Applicant: HYUNDAI MOBIS CO., LTD., Seoul (KR)

(72) Inventor: Min Ji Jin, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/912,225

(22) Filed: Oct. 10, 2024

(30) Foreign Application Priority Data

May 14, 2024 (KR) ........................ 10-2024-0062993

(51) Int. Cl.

| | |
|---|---|
| ***F21S 41/33*** | (2018.01) |
| ***F21S 41/153*** | (2018.01) |
| ***F21S 41/24*** | (2018.01) |
| ***F21S 41/32*** | (2018.01) |
| ***F21S 43/14*** | (2018.01) |
| ***F21S 43/235*** | (2018.01) |
| ***F21S 43/31*** | (2018.01) |
| *F21Y 115/10* | (2016.01) |

(52) U.S. Cl.

CPC ........... *F21S 41/337* (2018.01); *F21S 41/153* (2018.01); *F21S 41/24* (2018.01); *F21S 41/321* (2018.01); *F21S 43/14* (2018.01); *F21S 43/235* (2018.01); *F21S 43/31* (2018.01); *F21Y 2115/10* (2016.08)

(58) Field of Classification Search

CPC ........ F21S 41/337; F21S 41/24; F21S 41/153; F21S 41/321; F21S 43/14; F21S 43/31; F21S 43/235

See application file for complete search history.

(56) References Cited

U.S. PATENT DOCUMENTS

| | | | | |
|---|---|---|---|---|
| 2008/0037282 | A1* | 2/2008 | Kurihara | G02F 1/133617<br>362/618 |
| 2010/0038657 | A1* | 2/2010 | Higuchi | F21S 8/026<br>257/E33.068 |
| 2015/0069432 | A1* | 3/2015 | Chiu | H01L 25/0753<br>257/89 |
| 2017/0038051 | A1* | 2/2017 | Fukasawa | F21V 3/02 |
| 2018/0182940 | A1* | 6/2018 | Yamamoto | F21V 7/0083 |
| 2018/0245776 | A1* | 8/2018 | Gladden | F21V 14/02 |
| 2022/0205611 | A1* | 6/2022 | Yousefi | F21V 33/0052 |
| 2024/0130022 | A1* | 4/2024 | Jiang | H05B 45/54 |
| 2024/0401781 | A1* | 12/2024 | Lu | F21V 7/0083 |

* cited by examiner

*Primary Examiner* — Christopher E Dunay

(74) *Attorney, Agent, or Firm* — NovoTechIP International PLLC

(57) ABSTRACT

Disclosed is an optical module including a printed circuit board, a plurality of LEDs disposed on the printed circuit board so as to be spaced apart from each other in a first direction, a plurality of cover members configured to cover the plurality of LEDs, respectively, a reflective member including a plurality of recesses configured to expose the plurality of LEDs, respectively, the reflective member being configured to reflect light output from each of the LEDs in a lateral direction, a light guide layer configured to embed the plurality of LEDs, the plurality of cover members, and the reflective member, and a diffusion plate disposed on the light guide layer, wherein the plurality of LEDs is disposed at different intervals, and the light output from the plurality of LEDs is uniformly radiated in a lamp structure of a vehicle.

13 Claims, 7 Drawing Sheets

(a)

(b)

(a)

(b)

OPTICAL MODULE AND VEHICLE HAVING THE SAME

CROSS-REFERENCE TO RELATED APPLICATIONS

This application claims the benefit of Korean Patent Application No. 10-2024-0062993, filed on May 14, 2024, which is hereby incorporated by reference as if fully set forth herein.

TECHNICAL FIELD

The present disclosure relates to an optical module that enables light output from a plurality of LEDs to be uniformly radiated in a lamp structure of a vehicle and a vehicle having the same.

BACKGROUND

In general, a vehicle is equipped with various lamps that emit light forward depending on an ambient environment and time of day to secure a driver's vision and inform other vehicles of its traveling path.

These lamps are categorized according to the purposes of use, such as a turn signal for securing the driver's vision and indicating the position of the vehicle, together with a headlamp for illuminating ahead of the vehicle, a fog lamp for securing the driver's vision and indicating the position of the vehicle in a foggy or rainy condition, together with the headlamp, a reverse light for lighting up when the vehicle is in reverse, and a brake light for lighting up when the driver applies the brakes.

Halogen bulbs are mainly used for conventional vehicle lamps. When a halogen lamp is used as a light source, there is a reflector that reflects light irradiated by the halogen lamp, and the reflected light is irradiated forward. However, while halogen lamps have the advantage of being inexpensive, they have the disadvantages of high heat generation during use, low brightness relative to the amount of electricity used, and short lifespans.

To solve these problems, vehicle lamps using light emitting diodes (LEDs) have emerged. LED lamps have the advantages of high brightness, long lifespans, and low power consumption.

As described above, a plurality of LEDs is disposed to radiate light in order to realize various functions of the vehicle lamps, and in this case, the light output from the plurality of LEDs must be uniformly radiated. Conventionally, a structure including a number of components such as a lens for light diffusion is adopted in order to improve uniformity of the radiated light.

However, as the number of components increases, this becomes disadvantageous in terms of cost and maintenance, and there is a need for a means that solves these problems and enables the light output from the plurality of LEDs to be uniformly radiated.

SUMMARY

The present disclosure is to address at least the above-mentioned problems and/or disadvantages and to provide at least the advantages described below. Accordingly, an object of the present disclosure is to provide an optical module that enables light output from a plurality of LEDs to be uniformly radiated in a lamp structure of a vehicle and a vehicle having the same.

It is another object to provide an optical module capable of improving the uniformity of the radiated light by varying the distance between LEDs or by varying the shape of a reflective member that reflects the light output from each LED in a lateral direction and a vehicle having the same.

Objects of the present disclosure are not limited to the aforementioned object, and other unmentioned objects will be clearly understood by a person having ordinary skill in the art to which the present disclosure pertains based on the following description.

In an aspect, an optical module includes a printed circuit board (PCB), a plurality of LEDs disposed on the PCB so as to be spaced apart from each other in a first direction, a plurality of cover members configured to cover the plurality of LEDs, respectively, a reflective member including a plurality of recesses configured to expose the plurality of LEDs, respectively, the reflective member being configured to reflect light output from each of the LEDs in a lateral direction, a light guide layer configured to embed the plurality of LEDs, the plurality of cover members, and the reflective member, and a diffusion plate disposed on the light guide layer, wherein the plurality of LEDs is disposed at different intervals.

The plurality of LEDs may be disposed such that the LEDs adjacent to the outside of the PCB in the first direction are spaced apart from each other at a smaller interval than the LEDs adjacent to the center of the PCB in the first direction.

The amounts of light output from the plurality of LEDs may be different from each other.

Each of the plurality of recesses of the reflective member may include a reflective surface that is formed with a height at one end that is greater than the height of the LED and is sloped to the other end.

The plurality of recesses may be formed such that positions at which the plurality of LEDs is exposed are different from each other.

The plurality of recesses may be formed in different sizes.

The plurality of recesses may have different inclination angles of the reflective surface.

Each of the cover members may be formed in a shape having a small thickness in an upward-downward direction and may include a silicone material.

The optical module may further include a transflective plate disposed in the light guide layer.

The plurality of LEDs may be disposed spaced apart from each other in a second direction perpendicular to the first direction.

The amount of light output from some of the plurality of LEDs disposed in the first direction and the second direction may be greater than the amount of light output from the other LEDs.

The light guide layer may include a resin layer.

The plurality of LEDs may include top-emitting and side-emitting LEDs.

In another aspect, a vehicle includes a vehicle body, a lamp structure located in at least one of the front and rear portion of the body, and an optical module embedded in the lamp structure, wherein the optical module includes a PCB, a plurality of LEDs disposed on the PCB so as to be spaced apart from each other in a first direction, a plurality of cover members configured to cover the plurality of LEDs, respectively, a reflective member including a plurality of recesses configured to expose the plurality of LEDs, respectively, the reflective member being configured to reflect light output from each of the LEDs in a lateral direction, a light guide layer configured to embed the plurality of LEDs, the plurality of cover members, and the reflective member, and a diffusion plate disposed on the light guide layer, and the plurality of LEDs is disposed at different intervals.

BRIEF DESCRIPTION OF THE DRAWINGS

The accompanying drawings, which are included to provide a further understanding of the present disclosure and are incorporated in and constitute a part of this application, show embodiment(s) of the present disclosure and together with the description serve to explain the principle of the present disclosure. In the drawings.

DETAILED DESCRIPTION

Description will now be given in detail according to exemplary embodiments disclosed herein, with reference to the accompanying drawings. The same or equivalent components may be provided with the same reference numbers, and description thereof will not be repeated. As used herein, the suffixes “module” and “part” are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally used to distinguish one element from another.

It will be understood that when an element is referred to as being “connected with” another element, the element can be directly connected with the other element or intervening elements may also be present. In contrast, it will be understood that when an element is referred to as being “directly connected with” another element, there are no intervening elements present.

A singular representation may include a plural representation unless it represents a definitely different meaning from the context.

The terms such as “include” or “have” used herein are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Figure 1:
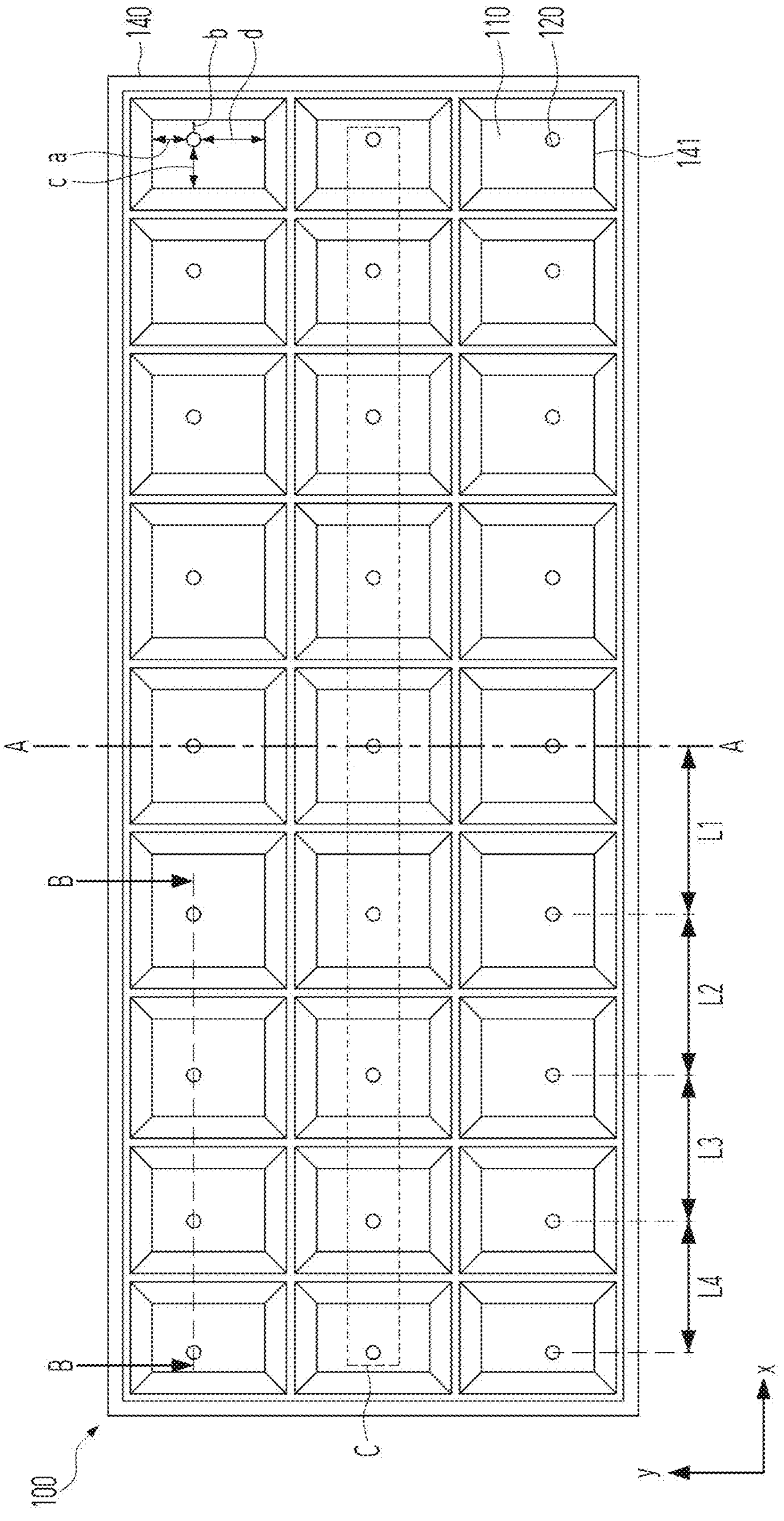
FIG. 1 is a top view of an optical module according to an embodiment of the present disclosure.
Figure 2:
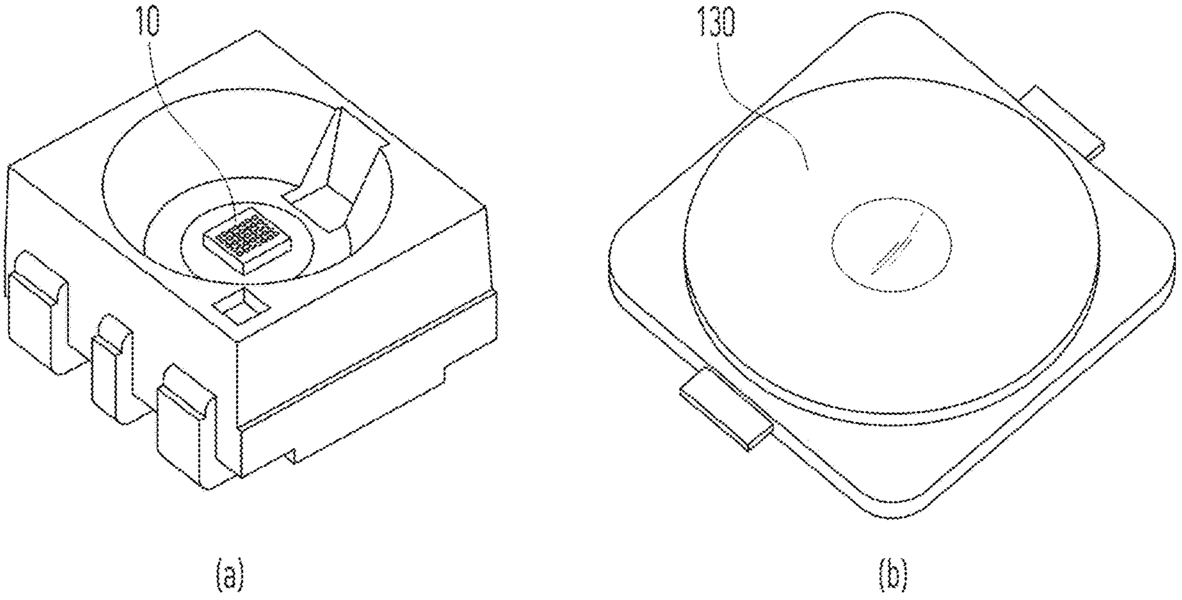
FIG. 2 is a view showing the shape of a cover member in the optical module according to the embodiment of the present disclosure.
Figure 3:
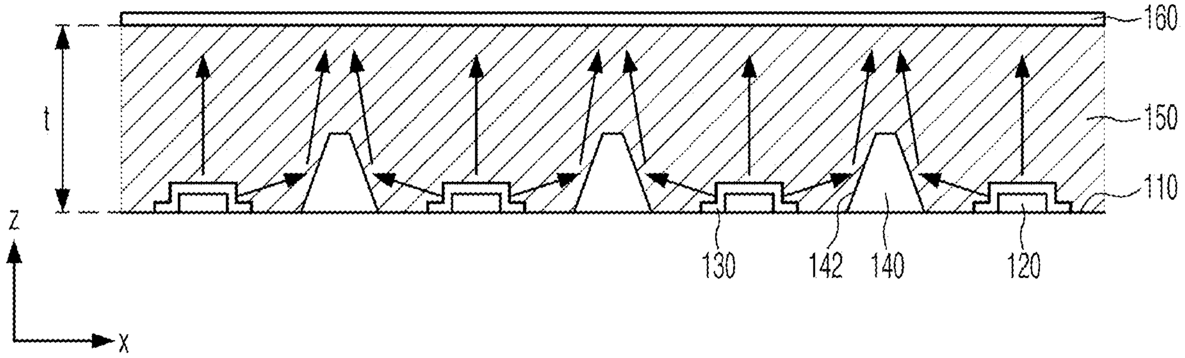
FIG. 3 is a B-B sectional view of FIG. 1.
Figure 4:
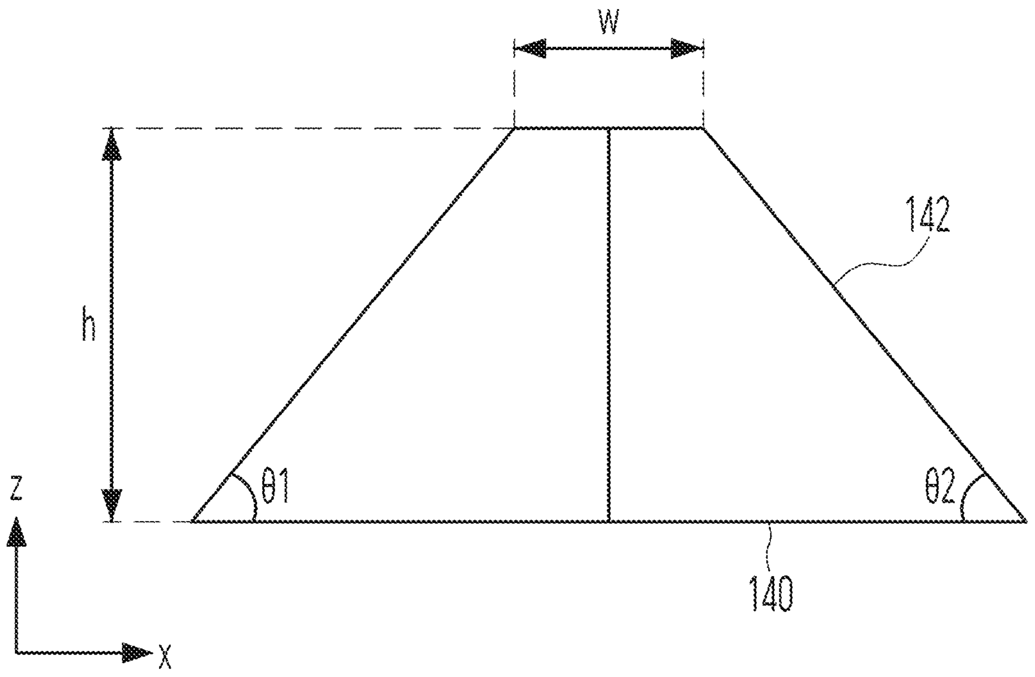
FIG. 4 is a view illustrating the shape of a reflective member in the optical module according to the embodiment of the present disclosure.
Figure 5:
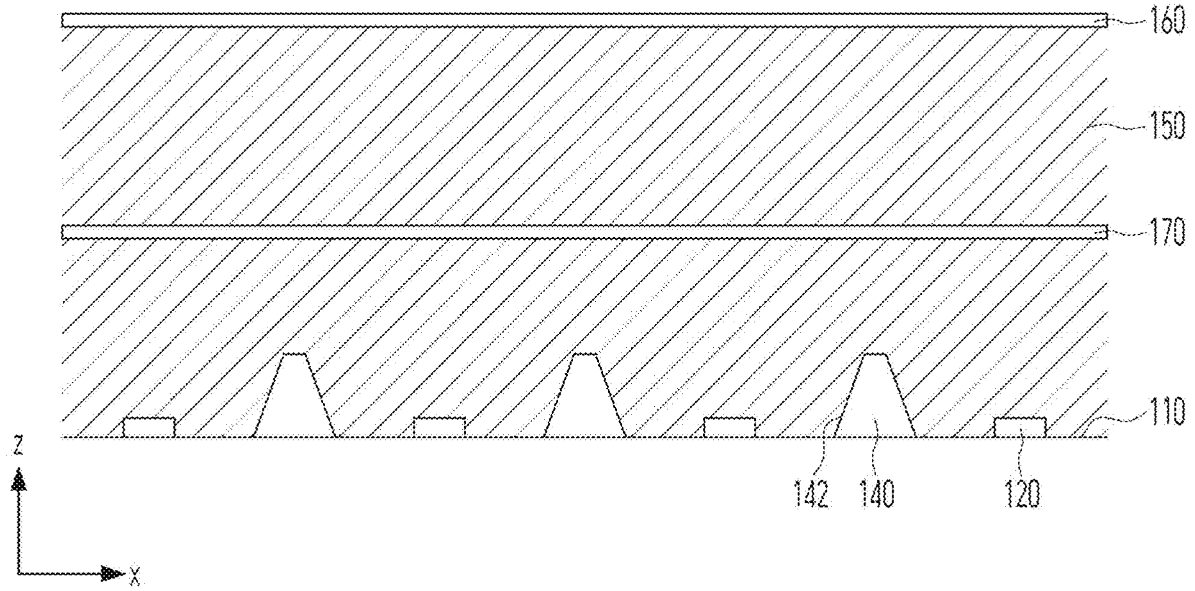
FIG. 5 is a view showing another embodiment of FIG. 3.
Figure 6:
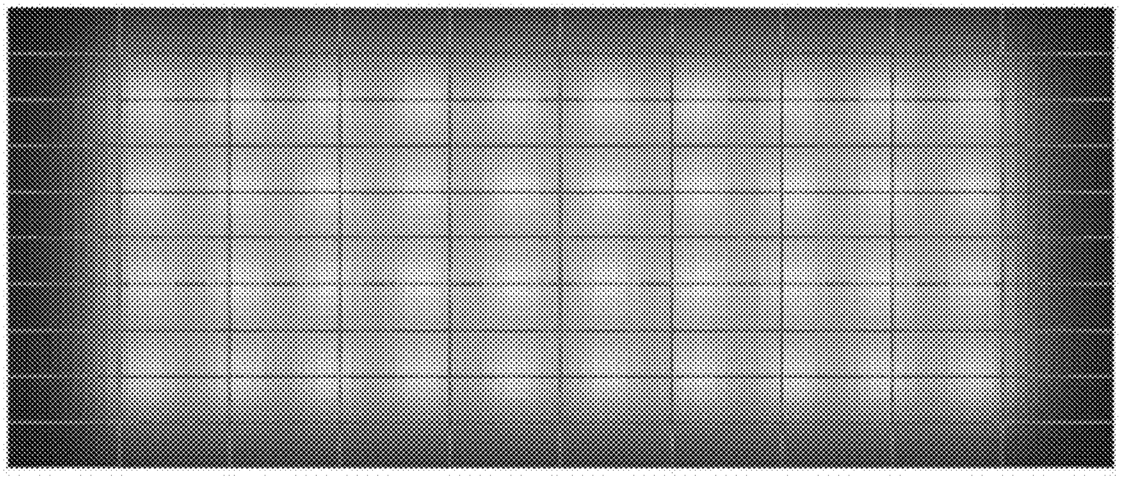
FIGS. 6 and 7 are views illustrating the effects of the optical module according to the embodiment of the present disclosure.
Figure 6:
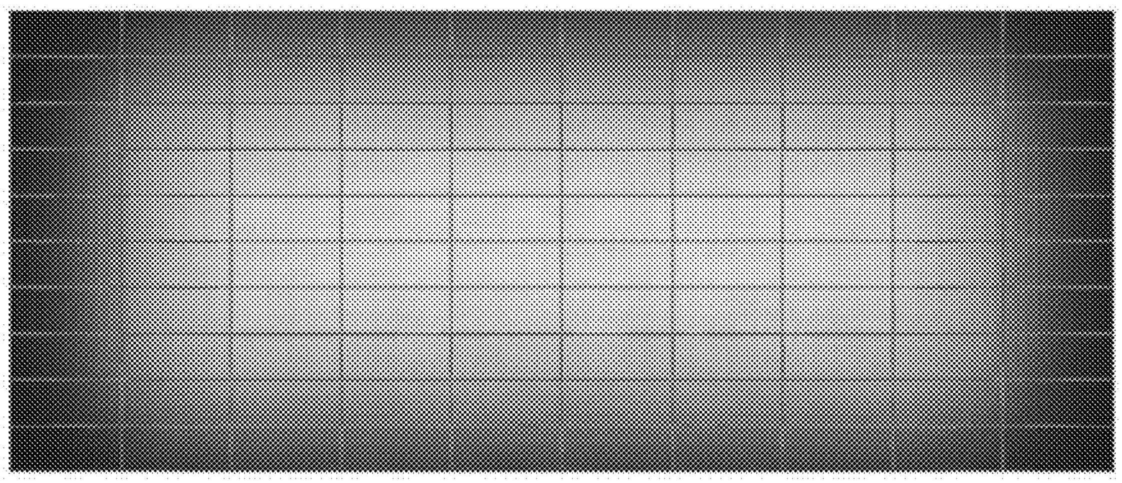
Figure 7:
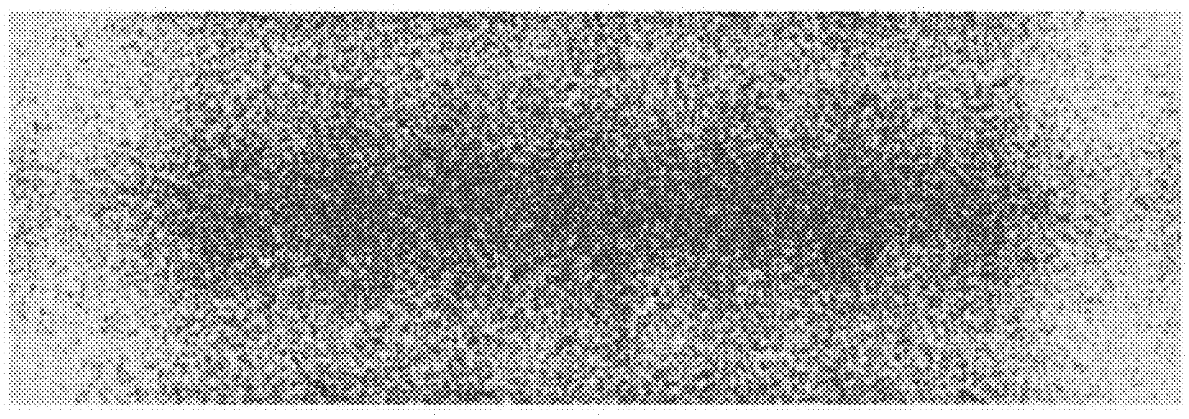
Figure 7:
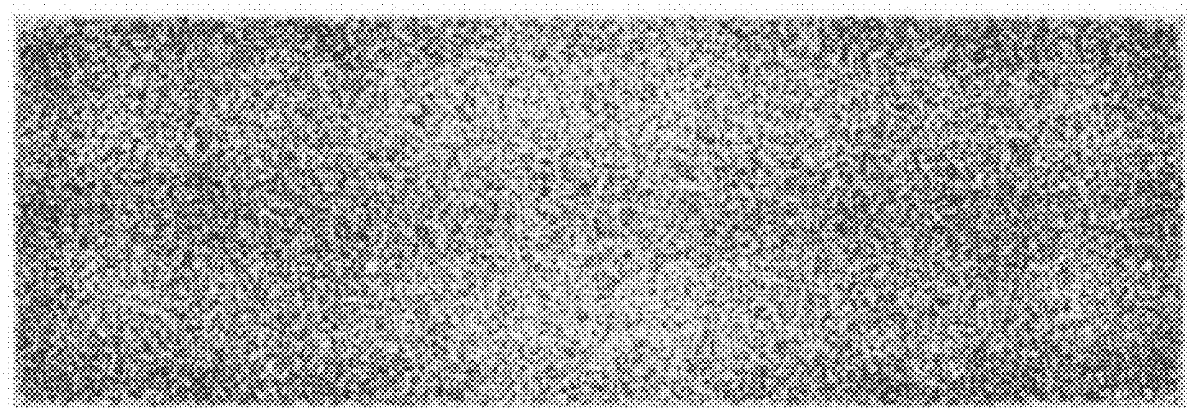

FIG. 1 is a top view of an optical module 100 according to an embodiment of the present disclosure. FIG. 2 is a view showing the shape of a cover member 130 in the optical module 100 according to the embodiment of the present disclosure. FIG. 3 is a B-B sectional view of FIG. 1. FIG. 4 is a view illustrating the shape of a reflective member 140 in the optical module 100 according to the embodiment of the present disclosure. FIG. 5 is a view showing another embodiment of FIG. 3. FIGS. 6 and 7 are views illustrating the effects of the optical module 100 according to the embodiment of the present disclosure.

Hereinafter, in describing the optical module 100 according to the embodiment of the present disclosure, a leftward-rightward direction is an x-axis direction, an upward-downward direction is a y-axis direction, and a forward-rearward direction is a z-axis direction.

Referring to FIGS. 1 to 3, the optical module 100 according to the embodiment of the present disclosure may include a printed circuit board (PCB) 110, a plurality of LEDs 120, a plurality of cover members 130, a reflective member 140, a light guide layer 150, and a diffusion plate 160. The plurality of LEDs 120 may be disposed on the PCB 110 so as to be spaced apart from each other in a first direction (x-axis direction). In addition, the plurality of LEDs 120 may be disposed spaced apart from each other in a second direction (y-axis direction), which is perpendicular to the first direction (x-axis direction). The plurality of LEDs 120 may be driven to output light when current is supplied thereto via the PCB 110.

Furthermore, in the optical module 100 according to the embodiment of the present disclosure, the plurality of LEDs 120 may include top-emitting and side-emitting LEDs, as shown in FIG. 3. Accordingly, the amount of light output and radiated from the plurality of LEDs may be greater than the amount of light output and radiated from top-emitting LEDs or side-emitting LEDs.

The plurality of cover members 130 may cover the plurality of LEDs 120, respectively. Here, (a) of FIG. 2 is a view showing the structure of a conventional LED module 10, and (b) of FIG. 2 is a view showing the shape of the cover member 130 that covers the LED 120 in the optical module 100 according to the embodiment of the present disclosure.

As shown in (b) of FIG. 2, the cover member 130 may be formed in a plate or disk shape having a small thickness in the upward-downward direction. In addition, the cover member 130 may include a silicone material. This may allow the light output from the plurality of LEDs 120 to be radiated over a wider area. Furthermore, the cover member 130 may serve to improve the uniformity of the radiated light, which will be described later, by reducing differences in light intensity depending on the orientation angle of the light output through the cover member.

Referring to FIGS. 1 and 3, in the optical module 100 according to the embodiment of the present disclosure, the reflective member 140 may include a plurality of recesses 141 that expose the plurality of LEDs 120, respectively. The reflective member 140 may serve to reflect light output from each of the LEDs 120 in a lateral direction.

Here, each of the plurality of recesses (or holes) 141 of the reflective member 140 may include a reflective surface 142 that is formed with a height at one end that is greater than the height of the LED 120 and is sloped to the other end.

Accordingly, the slope of the reflective surface 142 may reflect light output from each of the plurality of LEDs 120 in the lateral direction so as to face in the forward direction (z-axis direction), as shown in FIG. 3.

Referring to FIG. 6, (a) of FIG. 6 is a view showing an image in which light output from the plurality of LEDs 120 is radiated in the absence of the reflective member 140, and (b) of FIG. 6 is a view showing an image in which light output from the plurality of LEDs 120 is radiated in the presence of the reflective member 140. Comparing (a) of FIG. 6 to (b) of FIG. 6, it can be seen that there is a difference in the uniformity of the light depending on whether the reflective member 140 is provided.

Furthermore, in the optical module 100 according to the embodiment of the present disclosure, the plurality of LEDs 120, the plurality of cover members 130, and the reflective member 140 may be embedded in the light guide layer 150. Here, the light guide layer 150 may include a resin layer. That is, if the light guide layer 150 is made of a light guide resin, the effect of increasing light efficiency may be achieved. Moreover, the thickness t of the light guide layer 150 may be less than when a conventional light guide plate is used, and the structure may also be simplified.

The improvement in light efficiency by the light guide layer 150 may be achieved by increasing the amount of light output from the LED 120 due to a difference in the refractive index between the silicon-material cover member 130 covering the LED 120, and the light guide layer 150. For example, if the refractive index of the silicon-material cover member 130 is 1.5 and the refractive index of the light guide layer 150 including the resin layer is 1.47, the smaller the difference in refractive indices of the media through which light passes, the larger the critical angle, resulting in less light being lost in the LED 120. Thus, the amount of light output from the LED 120 may increase. In addition, the improvement in light efficiency may be achieved by reducing the amount of light leakage due to the structure in which light is radiated into the light guide layer 150, which is an optical member.

In the optical module 100 according to the embodiment of the present disclosure, the diffusion plate 160 may be disposed on the light guide layer 150, and the light output from the LED 120 may pass through the light guide layer 150 and diffuse through the diffusion plate 160.

In particular, as shown in FIG. 1, in the optical module 100 according to the embodiment of the present disclosure, the plurality of LEDs 120 may be disposed at different intervals L1, L2, L3, and L4. The plurality of LEDs 120 may be disposed such that a first group of the LEDs disposed adjacent to the outside of the PCB 110 in the first direction (x-axis direction) are spaced apart from each other at a smaller interval than a second group of the LEDs disposed adjacent to the center A-A of the PCB 110 in the first direction (x-axis direction).

Referring back to (b) of FIG. 6, it can be seen that the reflective member 140 may improve the uniformity of light compared to the case having no reflective member 140 but results in a larger distribution of light in the center. Therefore, the optical module 100 according to the embodiment of the present disclosure may address this by disposing the plurality of LEDs 120 at a small interval on the outside of the center where a lower light distribution is formed when disposing the plurality of LEDs 120 so as to be spaced apart from each other.

That is, in FIG. 1, L2 may be less than L1, L3 may be less than L2, and L4 may be less than L3. By reducing the distance between the LEDs 120 away from the center A-A of the PCB 110, a phenomenon in which a large light distribution is formed in the center may be reduced. As a result, the uniformity of the light output and radiated from the plurality of LEDs 120 may be improved.

Furthermore, in the optical module 100 according to the embodiment of the present disclosure, the amounts of light output from the plurality of LEDs 120 may be different from each other. For example, the amount of light output from the LEDs 120 away from the center A-A of the PCB 110 may be increased, which may reduce the unbalanced light distribution and improve the uniformity of the radiated light.

Moreover, in the optical module 100 according to the embodiment of the present disclosure, the plurality of recesses 141 of the reflective member 140 may be formed such that the positions at which the plurality of LEDs 120 is exposed are different from each other. That is, vertical distances a, b, c, and d from the LED 120 to the recess 141 may be different, as shown in FIG. 1. Here, a and b may be the same, c and d may be the same, and a and b may be less than c and d. Furthermore, the plurality of recesses 141 may be formed in different sizes. As a result, the unbalance in light distribution may be reduced, thereby improving the uniformity of the radiated light.

Referring to FIG. 4, in the optical module 100 according to the embodiment of the present disclosure, the plurality of recesses 141 may have different inclination angles of the reflective surface 142. For example, θ1 and θ2 shown in FIG. 4 may be different from each other. By forming different inclined angles of the reflective surface 142, the lights output from the plurality of LEDs 120 may be reflected differently to improve light uniformity.

FIG. 7 is a view illustrating the effects of the present disclosure, wherein (a) of FIG. 7 is a view showing light distribution when the plurality of LEDs 120 is equally spaced apart from each other, and (b) of FIG. 7 is a view showing light distribution by the optical module 100 according to the embodiment of the present disclosure. That is, by varying the distance between the LEDs 120, as shown in FIG. 7, the unbalanced phenomenon of the light distribution may be reduced, thereby improving the uniformity of the radiated light.

Referring back to FIG. 4, in the optical module 100 according to the embodiment of the present disclosure, the height h of the reflective member 140, the inclination angles θ1 and θ2 of the reflective surface 142, and the distance w between the recesses 141 may be numerically limited to optimize the optical efficiency and improve the uniformity of the radiated light. For example, the height h of the reflective member 140 may be 1 mm to 2 mm, the inclination angles θ1 and θ2 of the reflective surface 142 may be 30 degrees to 40 degrees, and the distance w between the recesses 141 may be 3 mm to 5 mm. By forming the reflective member 140 within these numerical ranges, it is possible to optimize the optical efficiency and improve the uniformity of the radiated light.

Referring to FIG. 5, the optical module 100 according to the embodiment of the present disclosure may include a transflective plate 170 disposed in the light guide layer 150. The transflective plate 170 is configured to prevent an internal configuration including the plurality of LEDs 120 from being visible from the outside of the vehicle when the plurality of LEDs 120 is not lit.

Additionally, as described above with reference to FIG. 1, in the optical module 100 according to the embodiment of the present disclosure, the plurality of LEDs 120 may be disposed in the first direction (x-axis direction) and the second direction (y-axis direction). Here, the amount of light output from some of the plurality of LEDs 120 may be greater than the amount of light output from the other LEDs 120.

In an embodiment, the amount of light output from the LEDs 120 disposed in region C of FIG. 1 may be greater than the amount of light output from the other LEDs 120 excluding region C. This serves to convey a warning signal more accurately to the outside by contrasting the illumination distributions of an image irradiated in a special situation, such as emergency braking, for example.

In view of the foregoing, the optical module according to the present disclosure and a vehicle having the same may ensure that the light output from the plurality of LEDs is uniformly radiated in a lamp structure of the vehicle. In addition, the uniformity of the radiated light may be improved by varying the distance between the LEDs or by varying the shape of the reflective member that reflects the light output from each LED in the lateral direction.

As is apparent from the above description, the optical module according to the present disclosure and the vehicle having the same may ensure that the light output from the plurality of LEDs is uniformly radiated in the lamp structure of the vehicle.

In addition, the uniformity of the radiated light may be improved by varying the distance between the LEDs or by varying the shape of the reflective member that reflects the light output from each LED in the lateral direction.

The effects of the present disclosure are not limited to those mentioned above, and other unmentioned effects will be clearly understood by a person having ordinary skill in the art to which the present disclosure pertains from the above description.

The above detailed description is to be construed in all aspects as illustrative and not restrictive. The scope of the present disclosure should be determined by reasonable interpretation of the appended claims and all changes coming within the equivalency range of the present disclosure are intended to be embraced in the scope of the present disclosure.

What is claimed is:

1. An optical module comprising:

a printed circuit board (PCB);

a plurality of LEDs disposed on the PCB and spaced apart from each other in a first direction;

a plurality of cover members respectively covering the plurality of LEDs;

a reflective member having a plurality of recesses respectively exposing the plurality of LEDs, the reflective member configured to reflect light output from the plurality of LEDs in a lateral direction;

a light guide layer embedding the plurality of LEDs, the plurality of cover members, and the reflective member; and a diffusion plate disposed on the light guide layer, wherein the plurality of LEDs is disposed at different intervals and includes:

a first LED group disposed adjacent to an outer edge of the PCB and including a first pair of LEDs neighboring each other in the first direction; and a second group of LEDs disposed adjacent to a center of the PCB and including a second pair of LEDS neighboring each other in the first direction, wherein an interval between the first pair of LEDs in the first direction is less than that between the second pair of LEDs in the first direction.

2. The optical module according to claim 1, wherein a plurality of light output amounts respectively from the plurality of LEDs are different from each other.

3. The optical module according to claim 1, wherein each of the plurality of recesses of the reflective member comprises a sloped reflective surface having a first end having a first height and a second end having a second height different from the first height, the first height of the first end being greater than a height of the plurality of LEDs.

4. The optical module according to claim 3, wherein the plurality of recesses is formed such that a plurality of positions at which the plurality of LEDs is respectively exposed are different from each other.

5. The optical module according to claim 3, wherein the plurality of recesses has different sizes.

6. The optical module according to claim 3, wherein the plurality of recesses has different inclination angles of the reflective surface.

7. The optical module according to claim 1, wherein the plurality of cover members has a plate shape and comprises a silicone material.

8. The optical module according to claim 1, further comprising a transflective plate disposed in the light guide layer.

9. The optical module according to claim 1, wherein the plurality of LEDs is spaced apart from each other in a second direction perpendicular to the first direction.

10. The optical module according to claim 9, wherein a light output amount from some of the plurality of LEDs disposed in the first direction and the second direction is greater than that from other LEDs.

11. The optical module according to claim 1, wherein the light guide layer comprises a resin layer.

12. The optical module according to claim 1, wherein the plurality of LEDs comprises a top-emitting LED and a side-emitting LED.

13. A vehicle comprising:

a vehicle body;

a lamp structure located in at least one of a front and rear portion of the vehicle body; and an optical module embedded in the lamp structure, wherein the optical module comprises:

a printed circuit board (PCB);

a plurality of LEDs disposed on the PCB and spaced apart from each other in a first direction;

a plurality of cover members respectively covering the plurality of LEDs;

a reflective member having a plurality of recesses configured to respectively expose the plurality of LEDs, the reflective member configured to reflect light output from each of the plurality of LEDs in a lateral direction;

a light guide layer embedding the plurality of LEDs, the plurality of cover members, and the reflective member; and a diffusion plate disposed on the light guide layer, wherein the plurality of LEDs is disposed at different intervals and includes:

a first LED group disposed adjacent to an outer edge of the PCB and including a first pair of LEDs neighboring each other in the first direction; and a second group of LEDs disposed adjacent to a center of the PCB and including a second pair of LEDS neighboring each other in the first direction, wherein an interval between the first pair of LEDs in the first direction is less than that between the second pair of LEDs in the first direction.

* * * * *